D. EVANGELISTA, B. DUGO & A. CIGNARELLA.
SAFETY DEVICE FOR PASSENGER AND FREIGHT ELEVATORS.
APPLICATION FILED JAN. 23, 1917.
1,291,815.
Patented Jan. 21, 1919.
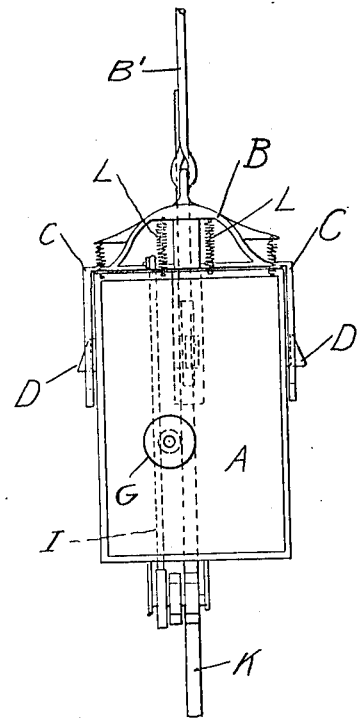
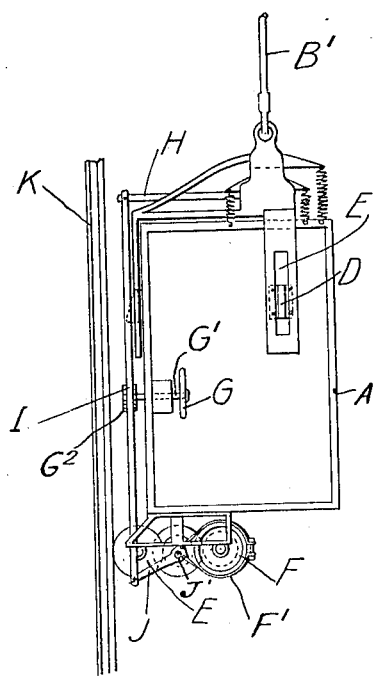
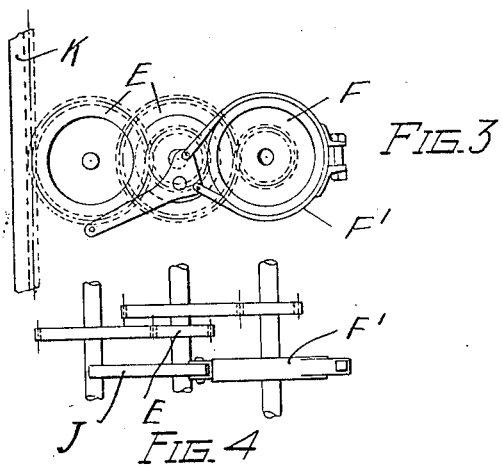
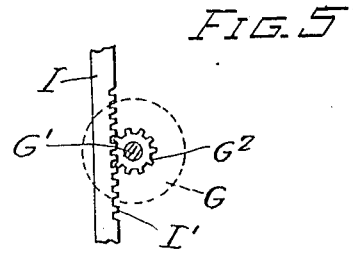
Inventors:
Dominick Evangelista
Bernardo Dugo
Andrea Cignarella
Witnesses:
Joseph Immerman
Eliot Norton

UNITED STATES PATENT OFFICE.

DOMINICK EVANGELISTA, BERNARDO DUGO, AND ANDREA CIGNARELLA, OF NEW YORK, N. Y.

SAFETY DEVICE FOR PASSENGER AND FREIGHT ELEVATORS.

1,291,815.  Specification of Letters Patent.  Patented Jan. 21, 1919.

Application filed January 23, 1917. Serial No. 144,085.

*To all whom it may concern:*

Be it known that we, DOMINICK EVANGELISTA, BERNARDO DUGO, and ANDREA CIGNARELLA, subjects of the King of Italy, residing in the city of New York, State of New York, have invented certain new and useful Improvements in Safety Devices for Passenger and Freight Elevators, of which the following is a specification.

Our invention relates to safety devices for passenger and freight elevators, and has for its object to provide a device of simple and efficient construction and operation, whereby upon the breaking of the hoisting rope or cable the elevator will be stopped and prevented from falling.

To this end the invention consists of certain mechanical parts and arrangements which readily can be attached and made a part of any elevator car and of the shaft in which it runs, as hereinafter will be described.

This object we accomplish in the manner and by the means hereinafter described and claimed, reference being had to the accompanying drawing, in which:—

Figure 1 is a front view of an elevator car fitted with our invention.

Fig. 2 is a side view of the same.

Fig. 3 is a side elevation of a train of gears which are attached to the bottom of the car.

Fig. 4 is a top plan view of the train of gears shown in Fig. 3.

Fig. 5 is an enlarged detail view of the mechanism for unlocking the stopping mechanism.

Our safety device, in the form herein selected for illustration, comprises an upright rack or toothed member K, running the whole length of the elevator shaft at one side. To the bottom of the car A is attached a train of gears E, in constant engagement with said rack K. Connected with the train of gears is a brake wheel F, and surrounding said brake wheel is a brake band F' attached to a brake lever J disposed under the car, and connected at its free end to a vertical rod I, which is attached at the top of the car to a cross arm H, running across the top of the car and fixed in turn to a cross bridge B, to which latter is attached the hoist rope or cable B' of the car.

Extending rigidly from the bridge B and depending upon the two sides and the rear of the car are frames C, while attached to the sides and rear of the car are lugs D fitted into slots E cut into said frames C, for a purpose hereinafter to be described. To the bridge B are attached a series of springs L, fastened at their lower ends to the roof of the car, and forming the sole means of connection between said bridge and car. Within the car is a hand wheel G, the shaft G' of which runs through the body of the car at the rear and carries at its outer end a gear wheel $G^2$, in mesh with a rack I', formed in or attached to the rod I.

In operation, the upward pull exerted by the rope or cable B' raises the cross bridge B and its attached frames C until the lugs D on the side and rear of the car engage the lower ends of the slots E in said frames. At the same time the raising of the frame C extends the springs L, which in turn, through arm H and rod I, raise the brake lever J, which is pivoted upon its supporting frame at J', thus releasing the band brake F' and permitting the train of gears C to run freely, though at all times geared with the upright rack K. If, however, the hoisting rope B' should break, the springs L will pull the cross bridge B downwardly carrying with it the cross arm H and rod I, thereby rocking said lever J on its pivot and engaging the hand wheel 1 tightly with its wheel F thereby checking the rotation of the gears E, which, by their engagement with the rack K will cause the car to come to a stop.

When the car has been stopped in this manner, and it is desired to release the brake band F', this can be accomplished manually by rotating the wheel G in the proper direction, its gear wheel $G^2$ raising the rod I to accomplish the desired result.

Having thus described our invention, what we claim as new and desire to secure by Letters Patent, is:—

1. The combination with an elevator car, and the hoisting cable therefor, of a bridge to which said cable is attached, springs connecting said bridge to said car, a toothed rack at one side of the elevator shaft, a train of gears on said car in constant engagement with said rack, connections between said bridge and said train of gears whereby the release of the former permitting said springs to draw it toward said car will check the rotation of said gears and thus stop the movement of said car, lugs on the sides of said car, and frames connecting the said bridge and slotted to engage said lugs to limit the relative movement of said bridge and car.

2. The combination with an elevator car, and the hoisting cable therefor, of a bridge to which said cable is attached, springs connecting said bridge to said car, a toothed rack at one side of the elevator shaft, a train of gears on said car in constant engagement with said rack, a vertical rod fixed at its upper end to said bridge, a brake band on said train of gears, a brake lever for applying said brake band and attached at its free end to said vertical rod in such manner that the movement of the bridge toward the car due to the tension of the springs intermediate the same will cause said vertical rod to apply said brake band, thereby checking the rotation of said gears and thus stopping the movement of the car, a hand wheel in said car, a gear wheel carried thereby, and a rack on said vertical rod with which said gear wheel is meshed whereby said rod may be moved longitudinally by the rotation of said hand wheel to release said brake band.

Signed at New York, in the county and State of New York, this 19th day of December, A. D. 1916.

DOMINICK EVANGELISTA.
BERNARDO DUGO.
ANDREA CIGNARELLA.

Witnesses as to all signatories:
GAETANO FAVAZZO,
DONATO CIGNARELLA.

Copies of this patent may be obtained for five cents each, by addressing the "Commissioner of Patents, Washington, D. C."